J. S. BARNES.
VARIABLE SPEED GEARING.
APPLICATION FILED FEB. 23, 1910.
998,227.
Patented July 18, 1911.
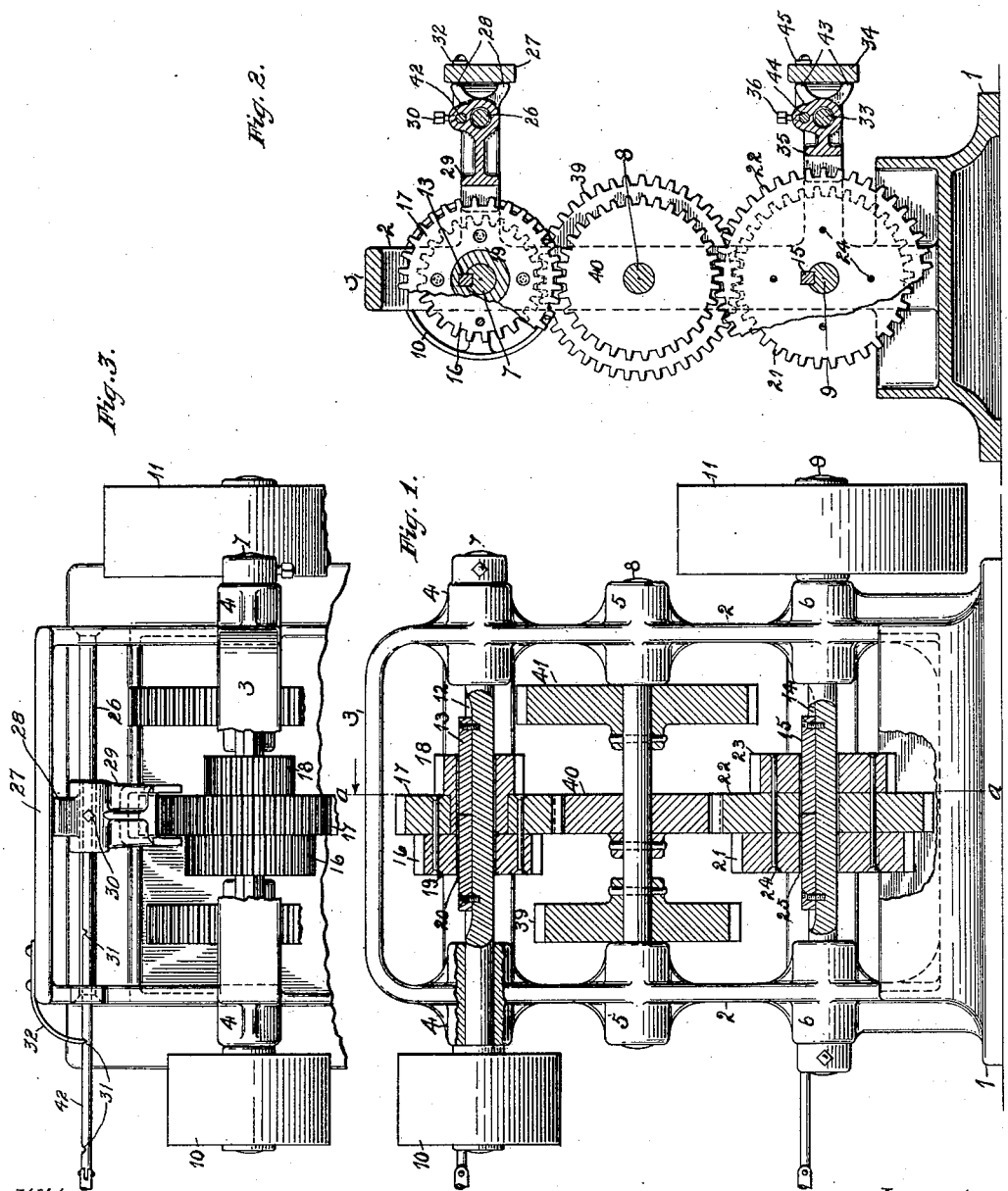
Witnesses:
W. L. Dow
E. Behel
Inventor:
John S. Barnes
By A. O. Behel
Atty.

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

VARIABLE-SPEED GEARING.

998,227.  Specification of Letters Patent.  Patented July 18, 1911.

Application filed February 23, 1910. Serial No. 545,542.

*To all whom it may concern:*

Be it known that I, JOHN S. BARNES, a citizen of the United States, residing at Rockford, in the county of Winnebago and State of Illinois, have invented certain new and useful Improvements in Variable-Speed Gearing, of which the following is a specification.

The object of this invention is to construct a variable speed gearing in which there are as many different speeds as there are gears, that is, there are nine gears through which nine different speeds may be attained.

In the accompanying drawings, Figure 1 is a partial elevation and section. Fig. 2 is a partial plan view in which parts are broken away. Fig. 3 is a section on dotted line *a a* Fig. 1.

From the base 1 rises two supports 2 connected by an upper end bar 3. The supports 2 are formed with bearings 4, 5 and 6, arranged in parallel relation. A shaft 7 is supported to revolve in bearings 4. A shaft 8 is supported to revolve in bearings 5, and a shaft 9 is supported to revolve in bearings 6. The shaft 7 has a pulley 10 connected with it, and the shaft 9 has a pulley 11 connected to it.

The shaft 7 has a keyway 12 within which is seated a key 13, and the shaft 9 has a keyway 14 within which is seated a key 15. The spur gears 16 and 17 are connected by rivets 19, and the spur gear 18 has a hub 46 forced in connection with the spur gear 17 and each of these gears is formed with a keyway 20 which receives the key 13. The three spur gears 21, 22 and 23 are connected by rivets 24 and each is formed with a keyway 25 which receives the key 15. A rod 26 is fixedly connected to a yoke 27 extending from the supports 2. On this rod 26 is slidably mounted a fork 29, the branches of which engage the spur gear 17. This fork 29 has two lugs 28 which bear against the end bar of the yoke 27 and serve to hold the fork 29 in a horizontal position. A rod 42 is connected to the fork 29 by the set screw 30. This rod extends through the yoke 27 and is provided with three notches 31 within which a spring 32 enters. By reciprocating the rod, the three gears 16, 17 and 18 will be moved along the shaft 7, in connection with the key 13.

A rod 33 is fixedly connected to a yoke 34 extending from the supports 2, and a fork 35 is slidably mounted on this rod. The branches of this fork engage the spur gear 22. This fork 35 has two lugs 43 which bear against the end bar of the yoke 34 and serve to hold the fork 35 in a horizontal position. A rod 44 is connected to the fork 35 by a set screw 36. This rod extends through the yoke 34 and is provided with three notches similar to the notches 31, and a spring 45 enters these notches. By reciprocating the rod, the three gears 21, 22 and 23 will be moved along the shaft 9 in connection with the key 15. To the shaft 8 are pinned three spur gears 39, 40 and 41, suitably separated.

Nine speeds are transmitted from the driving shaft 9 to the driven shaft 7, and I have not deemed it necessary to trace the position of the various gears for the different speeds.

I claim as my invention.

1. In variable speed gearing, the combination with coacting shafts, of gears mounted on one of the same, shiftable gears mounted on the other shaft and movable into and out of mesh with the first gears, a support, a rod mounted on the support and located alongside the shafts, and a fork slidably mounted on the rod and engaging the shiftable gears to move the same along the shafts, said fork having spaced bearing lugs that slidably engage the support to prevent the fork turning on the rod.

2. In variable speed gearing, the combination with a frame, of a driving and a driven shaft journaled thereon, a plurality of gear wheels of different diameters slidably mounted on each shaft, devices passing through the wheels for securing them together, an intermediate shaft, gears mounted on the intermediate shaft and arranged to mesh with the different gear wheels of the driving and driven shafts, yokes extending from the frame, rods carried by and located within the yokes, forks slidably mounted on the rods and embracing the gear wheels of largest diameter, said forks having spaced lugs that engage the inner sides of the yokes to prevent the forks turning on the rods, and means connected to the forks for moving the same.

In testimony whereof I have hereunto set my hand in presence of two subscribing witnesses.

JOHN S. BARNES.

Witnesses:
A. O. BEHEL,
E. D. E. N. BEHEL.

Copies of this patent may be obtained for five cents each, by addressing the "Commissioner of Patents, Washington, D. C."